(12) United States Patent
Goodfellow et al.

(10) Patent No.: US 8,069,728 B2
(45) Date of Patent: Dec. 6, 2011

(54) APPARATUS FOR OPTIMIZING SYSTEM PERFORMANCE AND RELATED CONTROL METHODS

(75) Inventors: John Goodfellow, Hertfordshire (GB); Kazuyoshi Ueno, Osaka (JP); Milan Prodanovic, Surrey (GB); Koshi Yamamoto, Osaka (JP); Norihiro Maeda, Osaka (JP)

(73) Assignee: IMV Corporation, Osaka (JP)

( * ) Notice: Subject to any disclaimer, the term of this patent is extended or adjusted under 35 U.S.C. 154(b) by 665 days.

(21) Appl. No.: 12/244,269

(22) Filed: Oct. 2, 2008

(65) Prior Publication Data
US 2009/0205430 A1    Aug. 20, 2009

(30) Foreign Application Priority Data

Feb. 20, 2008  (JP) ................................. 2008-039025
Jun. 24, 2008  (JP) ................................. 2008-164493

(51) Int. Cl.
*G01M 7/00*    (2006.01)
(52) U.S. Cl. ........................................................ 73/664
(58) Field of Classification Search .................. None
See application file for complete search history.

(56) References Cited

U.S. PATENT DOCUMENTS
2005/0120797 A1 *  6/2005  Butts ............................... 73/668

FOREIGN PATENT DOCUMENTS
JP    2001-013033    1/2001
JP    2002-206986    7/2002
* cited by examiner

*Primary Examiner* — Robert Raevis
(74) *Attorney, Agent, or Firm* — Jason H. Vick; Sheridan Ross PC

(57) ABSTRACT

Focusing on the criterion of "Energy save" or "Quiet noise" or other suitable operating parameter and considering the existing limitation of the operation of the electro-dynamic shaker system, apparatus for optimizing the operating condition of the vibration test system is proposed. The apparatus 100 measures the field current and drive current under the state that the desired vibration is fed to the specimen 20, and calculates the necessary force the shaker 1 should supply. Field current is supposed to be varied, and the necessary drive current is calculated based on the necessary force data. Further, the blower rotation is supposed to be varied, and the total power consumption at the coils and the blower is calculated. Also the temperatures of the field coil 4 and of the drive coil 10 is estimated and checked whether within the limitation. Then the optimal operating condition for the focused criterion is selected.

12 Claims, 12 Drawing Sheets

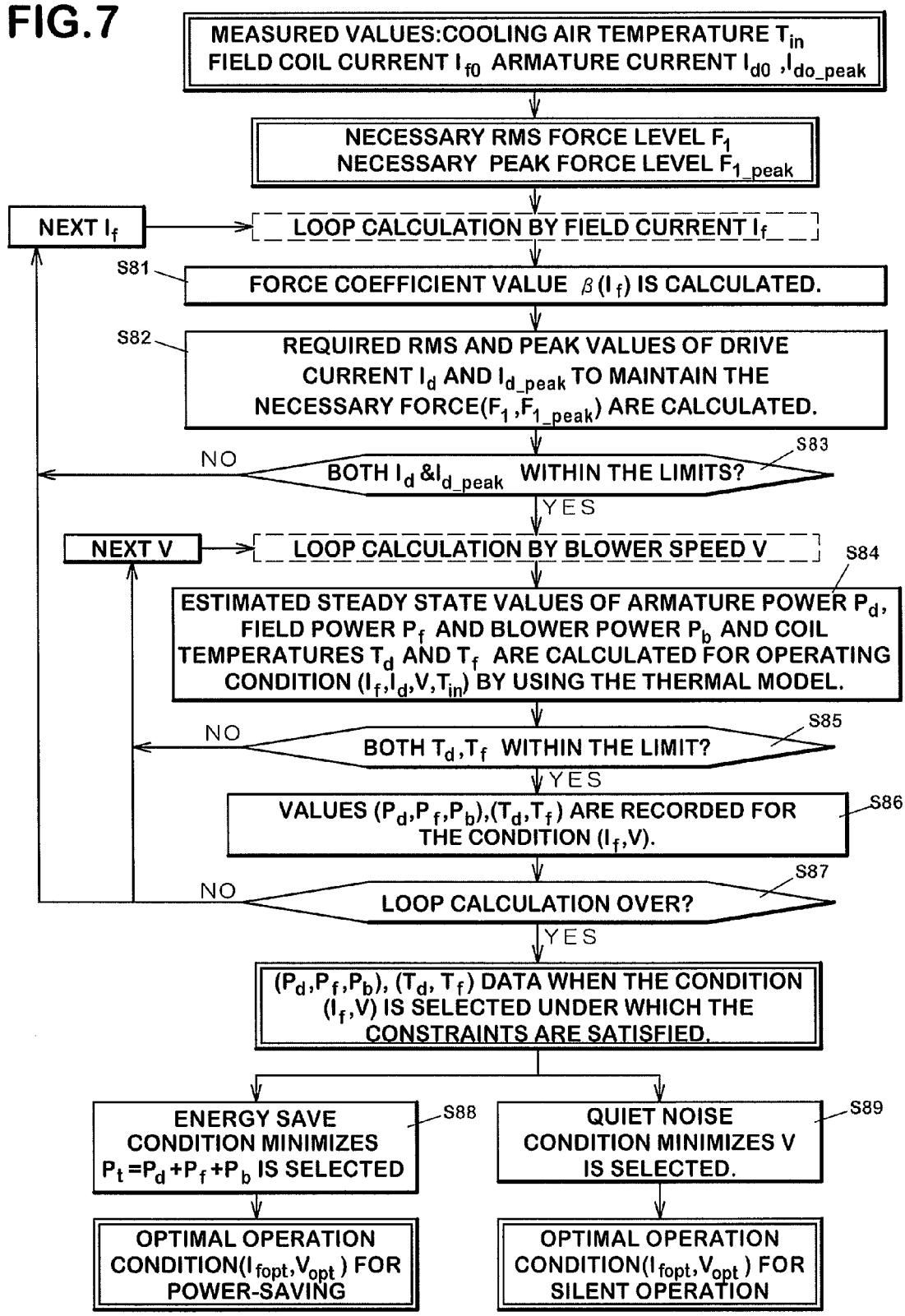

FIG.8A  DRIVE COIL TEMPERATURE

| BLOWER ROTATION (Hz) \ FIELD CURRENT (A) | 20 | 18 | 16 | ----- |
|---|---|---|---|---|
| 60 | 60℃ | 65℃ | 80℃ | ----- |
| 50 | 70℃ | 75℃ | 90℃ | ----- |

FIG.8B  FIELD COIL TEMPERATURE

| BLOWER ROTATION (Hz) \ FIELD CURRENT (A) | 20 | 18 | 16 | ----- |
|---|---|---|---|---|
| 60 | 55℃ | 50℃ | 75℃ | ----- |
| 50 | 70℃ | 75℃ | 98℃ | ----- |

FIG.8C  TOTAL POWER CONSUMPTION

| BLOWER ROTATION (Hz) \ FIELD CURRENT (A) | 20 | 18 | 16 | ----- |
|---|---|---|---|---|
| 60 | 1200 | 1250 | 1100 | ----- |
| 50 | 1100 | 1150 | 1000 | ----- |

FIG.8D  MARKING

| BLOWER ROTATION (Hz) \ FIELD CURRENT (A) | 20 | 18 | 16 | ----- |
|---|---|---|---|---|
| 60 |  |  |  | ----- |
| 50 |  |  | NG | ----- |

FIG.9

| |
|---|
| TOTAL ENERGY CONSUMED: 26,069WH (CONVENTIONAL 111,407WH [23.4%])<br>MEAN POWER (DRIVE): 1,398W (CONVENTIONAL 329W)<br>(FIELD): 778W (CONVENTIONAL 4,431W)<br>(BLOWER): 177W (CONVENTIONAL 5,300W)<br>(TOTAL): 2,354W (CONVENTIONAL 10,061W [23.4%])<br>MEAN TEMP. (DRIVE): 74.0C (CONVENTIONAL 28.6C)<br>(FIELD): 46.6C (CONVENTIONAL 62.9C)<br>MEAN CURRENT (DRIVE): 102.1ARMS (CONVENTIONAL 50.3ARMS)<br>(FIELD): 9.6ARMS (CONVENTIONAL 23.6ARMS) |

DESIRED ACCELERATION LEVEL

APPARATUS FOR OPTIMIZING SYSTEM PERFORMANCE AND RELATED CONTROL METHODS

TECHNICAL FIELD

The present invention relates to apparatus for optimization of the electro-dynamic shaker system operating condition according to the test purpose or situation and related method.

BACKGROUND ART

The inner structure of an electro-dynamic shaker is shown in FIG. 1. The field coil 4 is built in the magnetic circuit 2. The armature 6 is supported by the air suspension 8 so that it can move along the centre line of the shaker. Specimen of the vibration test can be attached at the head of the armature 6. The drive coil 10 is wound at the bottom of the armature 6.

When DC current is fed to the field coil 4, a static magnetic field is generated at the gap 12. The drive coil 10 is set in this gap 12, and AC current fed to the drive coil 10 yields a vibratory movement of the armature 6, and this motion is fed to the specimen attached on the armature 6 as the vibration for testing.

The air duct 14 is attached at the bottom of the magnetic circuit 2, and the other end of the duct 14 is connected to the blower 16. With rotating the blower 16, air-flow from the air-intake 18 at the top of the magnetic circuit 2 to inside is generated, and this air-flow cools the field coil 4 and the drive coil 10.

Although an air-cooled system is used for explanation here, this invention can be applied also to water-cooled systems by focusing attention to the power consumption or noise generation of the cooling apparatus.

A block diagram of a vibration test system using the electro-dynamic shaker in the FIG. 1 is shown in FIG. 2. Specimen 20 is attached on the top of the armature 6. Field current is fed to the field coil 4 by the field power supply 25. The blower power supply 27 feeds the power to the blower 16. Frequency spectrum of the desired vibration to be applied to the specimen is defined as the control reference spectrum for the vibration controller 22. The drive signal from the vibration controller 22 is amplified by the amplifier 24 and fed to the drive coil 10. Yielded vibration is measured by the acceleration sensor 30 attached on the armature 6, and this response signal is returned to the vibration controller 22. The spectral analysis of the response signal is carried out by the vibration controller 22, and the spectrum of the drive signal is modified so that the matching of the response spectrum to the reference spectrum will be improved in the next control loop. And the drive waveform signal is generated based on the new drive spectrum, and the drive signal is outputted to the amplifier 24. In such a way, generation of the desired vibration for the specimen to be tested is accomplished.

In addition to the above explained case of Random vibration test (random vibration having a required power spectral density is given to the specimen), Sine vibration test at a fixed frequency, Swept-sine vibration test that gives sinusoidal vibration of which frequency varies with time, and SOR (Sine-On-Random) or ROR (Random-On-Random) tests that are based on a combination of the former tests, Shock test that gives a pulse-shaped acceleration change described as a short time waveform, or Waveform replication test that regenerates the recorded vibration waveform for testing the specimen just as it was, are popularly conducted using the electro-dynamic shaker systems.

In the conventional electro-dynamic shaker systems, the value of the field coil current fed by the field power supply 26 is decided based on the maximum rating force of the corresponding system and fixed at the moment of the shipping at the manufacturer and could not be changed by the operator. So, it was impossible for the operator to carry out a test with reducing the field current value in case of only small excitation force is required to reduce the total power consumption. Even when it was allowed for the operator to change the field current by himself by some means, it was not easy to use appropriately, because professional knowledge and skill were required to predict the influence of the change of the field current setting correctly.

For instance, when the field current is reduced, then the drive current must be increased to keep the excitation force constant. So, reduction of the field current does not directly mean the reduction of total power consumption. A good balance between the field current and the drive current must be taken to achieve energy-saving.

In the Japanese laid-open patent application JP-A-200113033, there is disclosed a method to reduce the field current and its power consumption in the field coil when the required force is small. But when the increase of the drive power (caused by the drive current increase) as the result of the field current reduction is larger, then energy-saving of the total system cannot be achieved.

In addition, the Japanese laid-open patent application JP-A-200113033 discloses a method to reduce the blower rotation for the purpose of quiet operating when the required force is small. But just the same as above, it intends to solve the heat problem with focusing on the field current only. So, even if the purpose of quiet operating is looked as if it has been solved, the increase of heat generation by the drive current is not solved at all.

This invention provides apparatus that can calculate the optimal operating condition of the electro-dynamic shaker system in respect of the criteria such as energy-saving or quiet operating with regard to the performance limitations of the system and with solving the above mentioned problems.

SUMMARY OF THE INVENTION (1) According to the first aspect of the present invention, an apparatus for determining the operating condition of a shaker system that has a field coil, a drive coil that is set in the static magnetic field generated by the field coil and is driven by electromagnetic force, an armature that transfers the force generated at the drive coil to the test specimen, a cooling apparatus to cool the field coil and the drive coil, comprises:

means for calculating the necessary excitation force that is the excitation force presently generated by the shaker system, based on information of drive current necessary to yield the desired vibration for the test specimen under condition of a definite field current that is fed as initial field current;

means for calculating supposed drive current necessary to generate the necessary excitation force under each supposed field currents, the supposed field current being supposed to be varied from the initial field current;

means for calculating supposed temperatures of the field coil to which each of the supposed field current is fed and supposed temperatures of the drive coil to which each of the supposed drive current is fed under each supposed cooling capability of the cooling apparatus;

means for selecting at least one operating condition that is a combination of the supposed field current and the supposed cooling capability under which the supposed temperatures of the field coil and the drive coil will not exceed limitation and the focused operating feature will be satisfied among multiple combinations of the supposed field current and the supposed cooling capability;

means for outputting at least one of the operating conditions.

Therefore, an operating condition that satisfies the optimization of the focused feature of operation and with satisfying the temperature constraints can be determined by the proposed apparatus.

(2) In an apparatus for determining the operating condition according to the second aspect of the present invention, the means for calculating the supposed drive current calculates averaged RMS value and peak value of the supposed drive current; and the means for selecting the operating condition uses selection criterion that the averaged RMS value and the peak value of the supposed drive current will not exceed the rating RMS value and peak value of the supply circuit of the drive current.

Therefore, the desired operating condition is consistent with the rating of the supply circuit of the drive current.

(3) In an apparatus for determining the operating condition according to the third aspect of the present invention, the means for selecting the operating condition uses selection criteria that the supposed temperatures of the field coil and the drive coil will not exceed temperature limitation, and the sum of the supposed field power consumed by the supposed field current and supposed drive power consumed by the supposed drive current and supposed cooling power to get the supposed cooling capability will be a minimum.

Therefore, an operating condition to minimize the total power consumption of the shaker system can be set.

(4) In an apparatus for determining the operating condition according to the fourth aspect of the present invention, the means for selecting the operating condition uses the selection criteria that the supposed temperatures of the field coil and the drive coil will not exceed temperature limitation, and the cooling apparatus sound noise will be a minimum.

Therefore, an operating condition to minimize the cooling apparatus noise of the shaker system can be set.

(5) In an apparatus for determining the operating condition according to the fifth aspect of the present invention, the means for outputting the operating condition varies the field current gradually in stages from the present value to the supposed value specified in the selected operating condition, and keeps the stepwise change speed slower than the control speed of the vibration controller that controls the drive current so that desired vibration is maintained under the given field current.

Therefore, it is possible to bring the system operating condition to the determined new condition with keeping the vibration testing to the specimen continued and unaffected.

(6) An apparatus for determining the operating condition according to the sixth aspect of the present invention, comprises means for monitoring the drive current after the means for outputting the operating condition outputted the selected operating condition, and for obtaining a new operating condition by activating the means for calculating the necessary drive force, the means for calculating the supposed drive current, the means for calculating the supposed temperatures and the means for calculating the operating condition, and wherein the new operating condition is outputted from the means for outputting the operating condition.

Therefore, tracking control ability to trace the change of the excitation situation and find a new desirable operating condition can be realized. Also, undesirable disturbance in control can be avoided by neglecting smaller changes than the threshold.

(7) According to the seventh aspect of the present invention, an apparatus for determining the operating condition of a shaker system that has a field coil, a drive coil that is set in static magnetic field generated by the field coil and is driven by electromagnetic force, an armature that transfers force generated at the drive coil to test specimen, a cooling apparatus to cool the field coil and the drive coil, comprises:

means for detecting the drive current necessary to yield the desired vibration for the test specimen under the condition of the presently fed field current;

means for calculating supposed temperatures of the field coil to which each of the present field currents is fed and supposed temperatures of the drive coil to which each of the necessary drive currents is fed under each supposed cooling capability of the cooling apparatus;

means for selecting at least one operating condition that is a supposed cooling capability under which supposed temperatures of the field coil and the drive coil will not exceed limitation;

means for outputting the operating condition.

Therefore, an operating condition that satisfies the temperature constraints can be determined by the proposed apparatus.

(8) An apparatus for determining the operating condition according to the eighth aspect of the present invention comprises means for controlling cooling apparatus that monitors temperatures of the field coil and the drive coil under the controlled operating condition, and controls to increase the cooling capability when either of the temperatures exceeds the limitation.

Therefore, the temperatures of the coils can be cooled down when the supposed temperatures of the field coil and/or drive coil get higher than the result of the calculation means for the supposed temperature.

(9) In an apparatus for determining the operating condition according to the ninth aspect of the present invention, the means for outputting the operating condition outputs the operating condition selected by the means for selecting the operating condition in a real-time manner.

Therefore, the operating condition can be continuously adjusted and controlled to one that is optimized with continuous operation of the test operation.

(10) In an apparatus for determining the operating condition according to the tenth aspect of the present invention, the means for outputting the operating condition outputs the operating condition selected by the means for selecting the operating condition prior to the operation.

Therefore, test operation based on the optimized operating condition calculated prior to the test operation can be carried out.

(11) In an apparatus for determining the operating condition according to the eleventh aspect of the present invention, the means for selecting the operating condition calculates the operating condition at each moment as a time series.

Therefore, test operation based on the optimized operating condition schedule calculated prior to the test operation can be carried out.

(12) According to the twelfth aspect of the present invention, a method for determining the operating condition of a shaker system that has a field coil, a drive coil that is set in a static magnetic field generated by the field coil and is driven by electromagnetic force, an armature that transfers force generated at the drive coil to the test specimen, a cooling apparatus to cool the field coil and the drive coil, comprises steps of:

calculating the necessary excitation force that is the excitation force presently generated by the shaker system, based on information of drive current necessary to yield the desired vibration for the test specimen under the condition of a definite field current that is fed as the initial field current;

calculating the supposed drive current necessary to generate the necessary excitation force under each supposed field currents, the supposed field current being supposed to be varied from the initial field current;

calculating supposed temperatures of the field coil to which each of the supposed field current is fed and supposed temperatures of the drive coil to which each of the supposed drive current is fed under each supposed cooling capability of the cooling apparatus;

selecting at least one operating condition that is a combination of the supposed field current and the supposed cooling capability under which the supposed temperatures of the field coil and the drive coil will not exceed the limitation and the focused operating feature will be satisfied among multiple combinations of the supposed field current and the supposed cooling capability;

outputting at least one of the operating conditions.

The following Steps refer to those shown in FIGS. 6 and 7.

The calculation means for the necessary excitation force is a method to calculate the necessary excitation force substantially based on the drive current. Here, the word 'substantially' means not only the case directly based on the drive current data but also such cases to calculate the necessary drive current using the drive current-acceleration characteristics data measured prior to the operation and the data of required acceleration such as a swept-sine profile.

Step S7 corresponds to the "Calculation means for the necessary excitation force" in embodiment.

Step S82 corresponds to the "Calculation means for the supposed drive current" in embodiment.

Step S84 corresponds to the "Calculation means for the supposed temperature" in embodiment.

Step S88 and S89 correspond to the "Selection means of the operating condition" in embodiment.

Step S9 corresponds to the "Output means of the operating condition" in embodiment. "Output means of the operating condition" can be one that outputs the operating condition and controls other apparatus, and also can be one that just outputs the operating condition.

"Program" means not only executable programs but also includes the concept of source programs, compressed programs and enciphered programs.

The forgoing forms and other forms, objects, and aspects as well as features and advantages of the present invention will become further apparent from the following detailed description of the presently preferred embodiments, read in conjunction with the accompanying drawings. The detailed description and drawings are merely illustrative of the present invention rather than limiting the scope of the present invention being defined by the appended claims and equivalents thereof.

BRIEF DESCRIPTION OF THE DRAWINGS

FIG. 7 is a flowchart of the optimization program of the operating condition 27.

FIG. 8 is a conceptual explanation of a recorded table of combination of the operating conditions.

FIG. 9 is an exemplified display of optimization result.

DESCRIPTION OF THE PREFERRED EMBODIMENT

1. A First Embodiment 1.1 System Configuration

Figure 3:
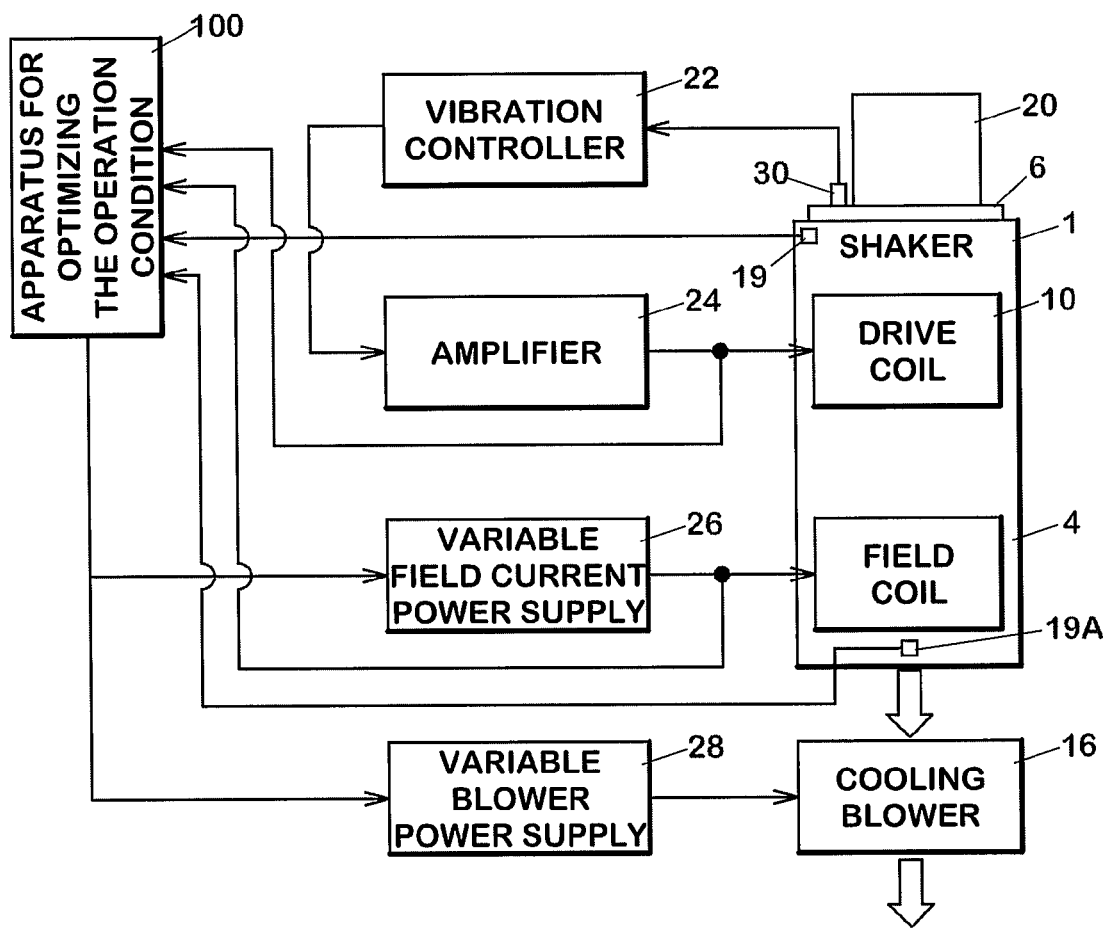
FIG. 3 is a diagrammatical model of an embodiment of a vibration test system by this invention.

System configuration of the apparatus 100 for optimizing the operating condition is shown in FIG. 3. Vibration controller 22 (e.g. "K2" of IMV Corporation can be used for this purpose) controls the drive signal that is fed to the drive coil 10 via the amplifier 24 so that the vibration having the desired spectrum is fed to the specimen 20.

The apparatus 100 for optimizing the operating condition observes the drive current fed to the drive coil 10 by the amplifier 24 and the field current outputted by the variable field current power supply 26, and determines a preferable operating condition that meets the purpose of the operation based on this information. And with keeping the situation that the specimen 20 is fed with the desired vibration controlled by the vibration controller 22, the apparatus 100 controls the variable field current power supply 26 and the variable blower power supply 28 so that the operating condition gradually reaches the determined one. This embodiment is not only suitable for the random vibration test that feeds vibration having a desired spectrum to the specimen, but also for other vibration test such as swept-sine test that feeds sinusoidal vibration having continuously varying frequency.

Figure 4:
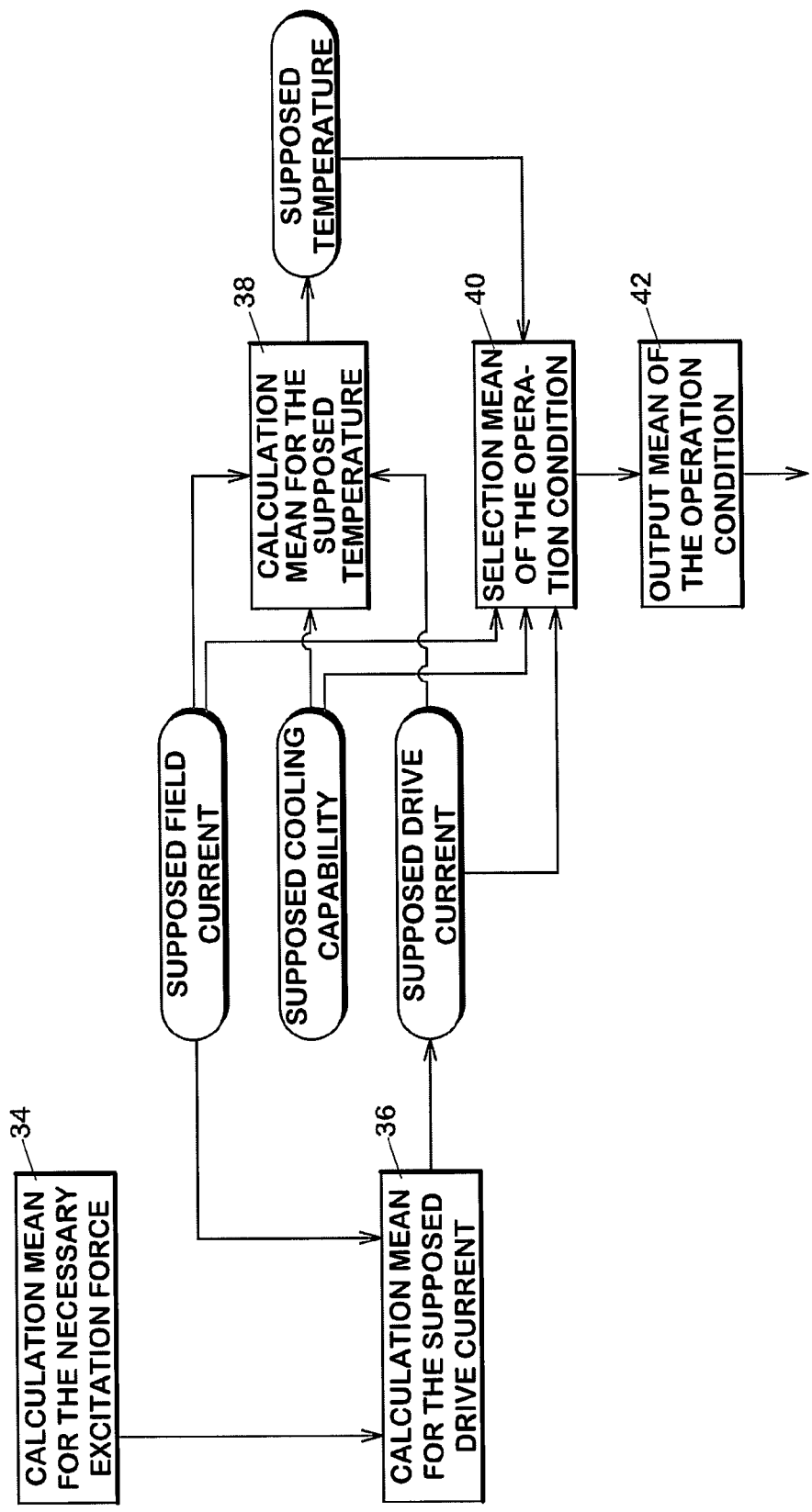
FIG. 4 is a functional block diagram of the first mode of embodiment of the apparatus for optimizing the operating condition.

A functional block diagram of the apparatus 100 for optimizing the operating condition is shown in FIG. 4. The drive current fed to the drive coil 10 is controlled by the vibration controller 22 under the condition that a standard condition field current is fed to the field coil 4. When the control by the vibration controller 22 is settled, the calculation means for the necessary excitation force 34 measures the said field current and the said drive current, and calculates the excitation force that the said shaker 1 is generating. The excitation force value calculated as in above is the force necessary to feed the desired vibration to specimen 20 using this shaker 1.

The calculation means for the supposed necessary drive current 36 calculates the necessary supposed drive current at each supposed field current that is varied from the said standard field current value.

The calculation means for the supposed temperature 38 calculates the supposed field coil temperature when the said supposed field current is fed to the field coil 4 and the supposed drive coil temperature when the said supposed drive current is fed to the drive coil 10. As the supposed cooling capability is varied, the calculation means for the supposed temperature 38 calculates the above supposed temperatures.

The selection means of the operating condition 40 selects a combination of supposed field current and supposed cooling capability under which the supposed temperatures of the field coil and the drive coil will not exceed the limitation and the focused feature of operation will be satisfied among multiple combinations of supposed field current and supposed cooling capability when applied as the operating condition to the shaker 1. For instance, when the sound noise is the focused feature of operation, the combination of supposed field current and supposed cooling capability that will realize the minimum blower rotation is selected among the combinations that satisfy the temperature criterion. When the power consumption is the focus of operation, the combination of supposed field current and supposed cooling capability is selected that will realize the minimum total power consumption of the system.

The output means of the operating condition 42 controls the variable field current power supply 26 to change the field current from the present value to the supposed field current value indicated in the said selected operating condition gradually under the situation the specimen 20 is fed with the desired vibration controlled by the vibration controller 22. At the same time, the output means 42 controls the variable blower power supply 28 to change the blower rotation to the supposed rotation value indicated in the said selected operating condition gradually. The transition time for each step in the above gradual change should be kept longer than the necessary time for the stable control by the vibration controller 22 that controls the drive current corresponding to the change of the field current.

As explained above, it is possible to control the operation of the vibration test system to be carried out under a preferable operating condition without disturbing the testing of the specimen 20.

1.2 Hardware Configuration

Figure 1:
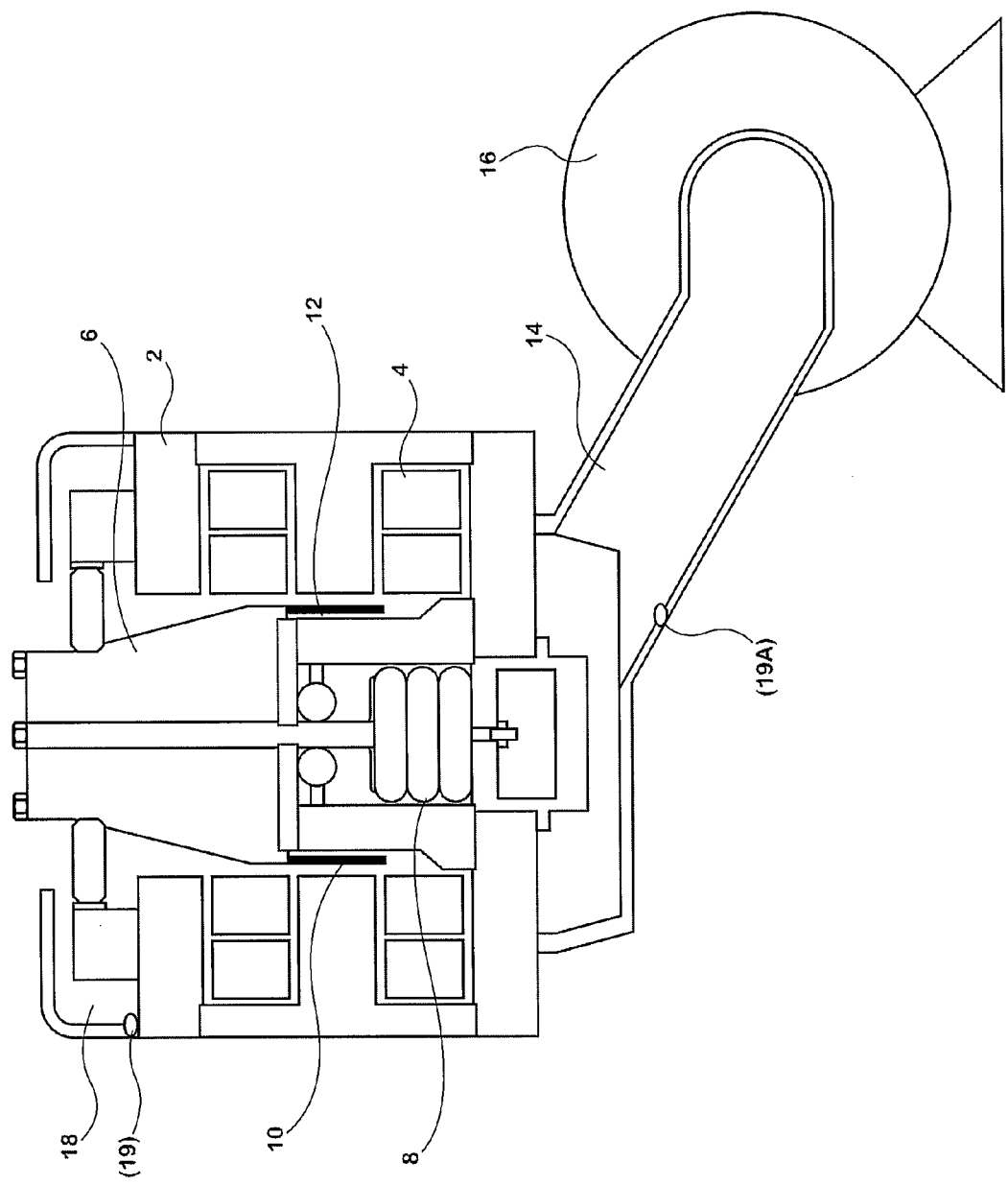
FIG. 1 shows the inner structure of electro-dynamic shaker (air-cooled type).
Figure 2:
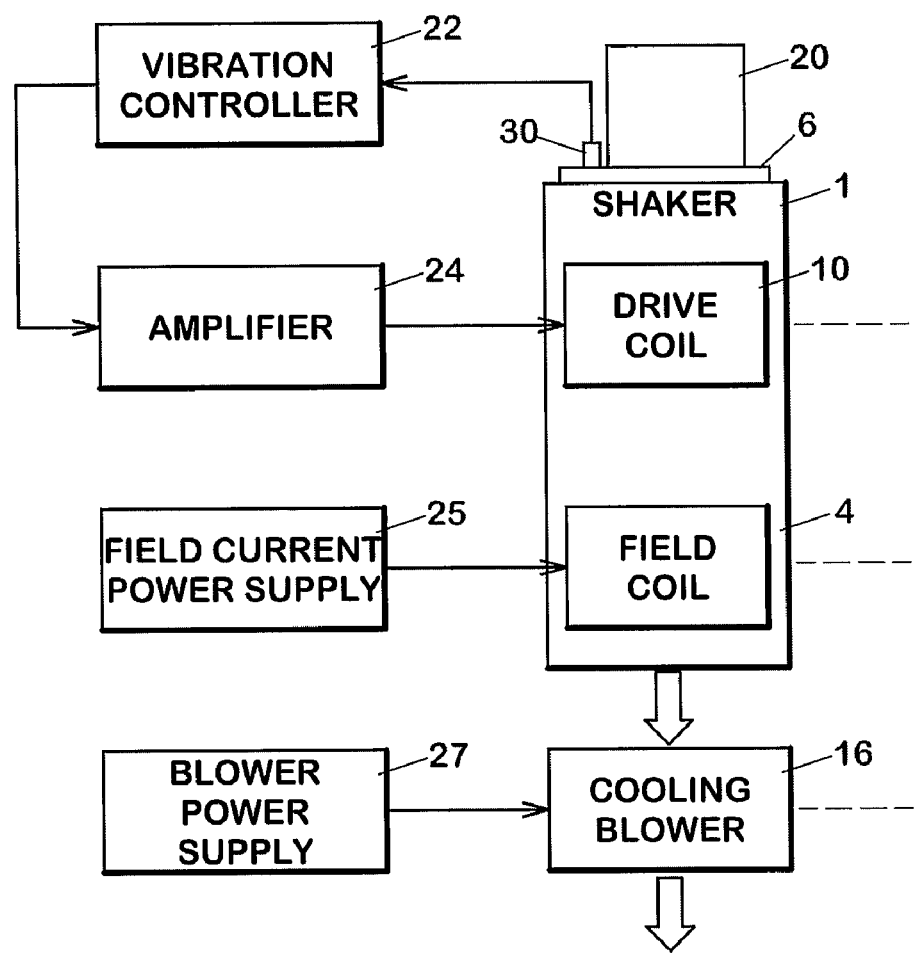
FIG. 2 is a diagrammatical model of a conventional vibration test system.

The shaker 1 used in this embodiment has the conventional structure as shown in the FIG. 1, but differs only at the point that the temperature sensor 19 is set at the air-intake 18 for the cooling air and the temperature sensor 19A is set at the vent 14. By this temperature sensor 19 and 19A, the temperature of the cooling air and the amount of temperature raised by the heat generation of the coils can be measured.

In the embodiment explained below, the sensor 19 is used. But the sensor 19A can be an alternative, or both of them can be used as stated later.

Figure 5:
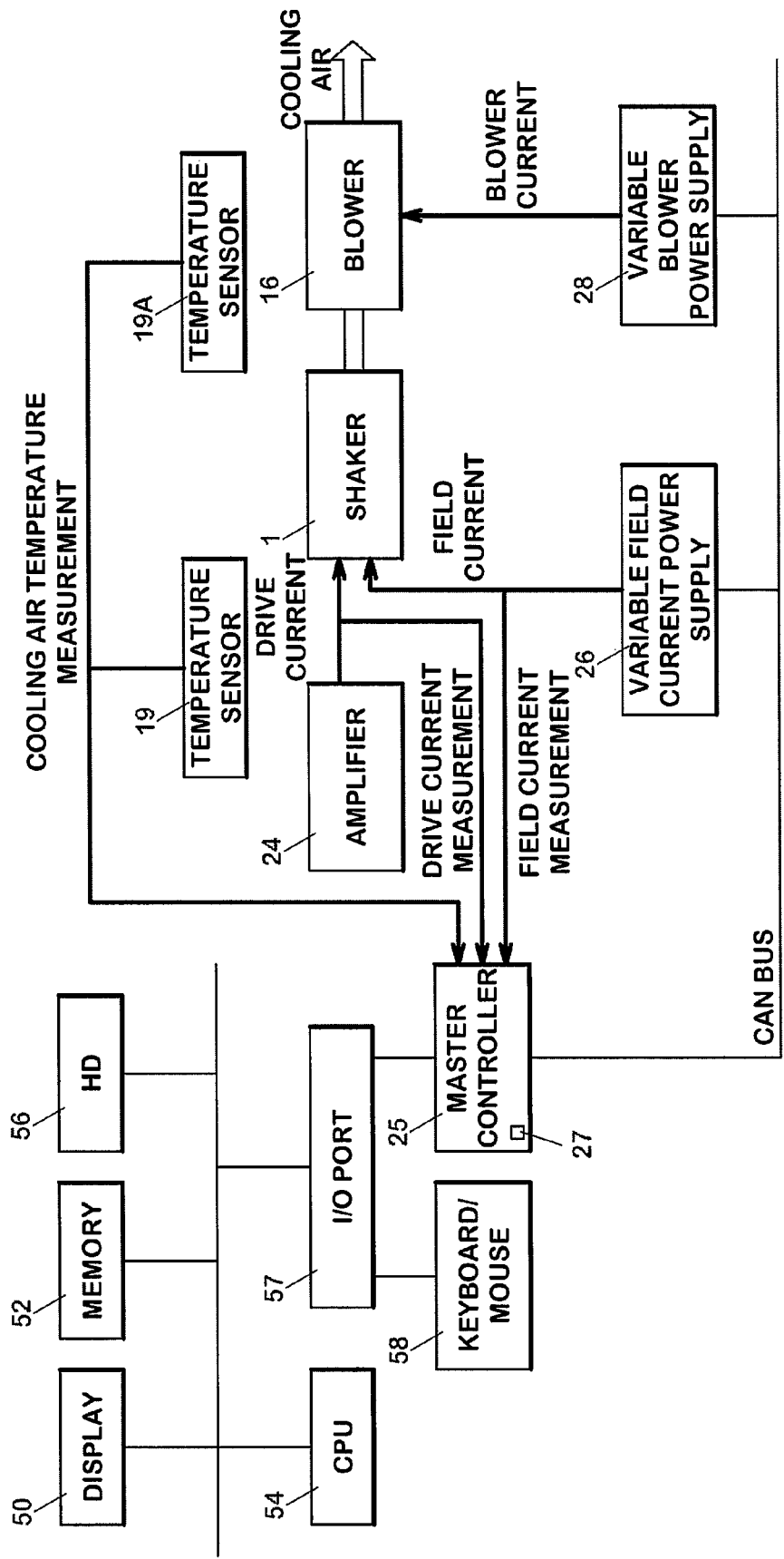
FIG. 5 is an example of hardware implementation of the apparatus for optimizing the operating condition.

An example of the hardware implementation configuration of the apparatus 100 for the operating condition optimization using a PC (personal computer) and the dedicated hardware is shown in FIG. 5. CPU 54 supervises the whole system and the user interface with the connected components such as the main memory 55, hard disk 56, keyboard/mouse 58, display 50 and other peripherals. It is convenient to use a PC for this part.

Via the I/O port 57, a dedicated hardware called "master controller" 25 is connected, and the variable field current power supply 26 and the variable blower power supply 28 is connected to the master controller 25. The master controller 25 can command the variable field current power supply 26 and the variable blower power supply 28 and control the outputs of these power supplies.

To measure the drive current from the amplifier 24, the field current from the variable field current power supply 26 and the temperature at the sensor 19, analogue output signals from the sensors are fed to the master controller 25. The master controller 25 is realized as a DSP (digital signal processor) system having memory and I/O ports. In the memory, program codes for the optimization of the operating condition procedure are stored. The control of the field current using the variable field current power supply 26 and of the blower rotation using the variable blower power supply 28 is carried out via the I/O port. The output signals of the sensors from the amplifier 24, from the variable field current power supply 26 and from sensor 19 are digitized by the A/D converter under control of the DSP.

The variable field current power supply 26 and the variable blower power supply 28 are dedicated switching converter systems each designed for each required function. These are dedicated systems comprising of the power circuit and the control circuit (DSP). Each system is controlled by the DSP program on the control board and can communicate with the master controller 25 via network (CAN bus is used in this embodiment). Receiving the command from the master controller 25, the DSP in the variable field current power supply 26, or in the variable blower power supply 28, controls and drives the power devices to operate the required switching converter and thereby supply the required output.

In the hard disk, an OS (operating system) and dedicated software that supervises the control of the dedicated hardware and user interface are loaded. The software works together with the OS to affect the function required. The OS can be omitted when possible.

1.3 Measurement of the Characteristics of the Excitation System

Data of the characteristics of the shaker 1 and the excitation system are necessary for the apparatus 100 for optimizing the operating condition and to determine the optimal operating condition. In this embodiment, the characteristic data are recorded in the master controller 25 as the program codes 27 for the optimization. Data of Field current—Force coefficient relationship experimental formula, Power consumption formula, Temperature model formula, the standard operating condition and the ratings of the amplifier are recorded in the codes.

(1) At first, the Field current—Force coefficient relationship experimental formula is recorded. The procedure to get the experimental formula is as follows:

The drive current $I_d[A]$ is set at a fixed value, and the field current $I_f[A]$ is varied and fed to the shaker 1. The excitation force $F[N]$ generated at the armature 6 is measured, and from this result, Force coefficient function $\beta[N/A]$ that gives the generated force per unit current ($1[A]$) under the fed field current $I_f[A]$ expressed in a polynomial function form below is determined. For example, when 5-th order polynomial is assumed, $$\beta = K5*I_f^5 + K4*I_f^4 + K3*I_f^3 + K2*I_f^2 + K1*I_f \quad \text{(A-1)}$$

Field current—Force coefficient is one of the basic characteristics of a shaker system that gives the force intensity that is generated by the shaker when the intensity of the drive current fed is multiplied to it:

$$F = \beta I_d \quad \text{(A-2)}$$

This formula of $\beta(I_d)$ is different for individual shakers, but for the same shaker it does not depend on the load condition. As this formula can also be regarded time-invariant, the defined data at the moment of shipping from the manufacturer or at periodical maintenance can be used commonly for all the testing activities by the shaker system.

(2) Next, the Power consumption formulae and the Temperature model formulae are recorded. The Power consumption formulae describe the relationship of the drive current and the power consumption at the drive coil 10, the relationship of the field current and the power consumption at the field coil 4 and the relationship of the blower rotation and the power consumption at the blower 16. The Temperature model formulae describe a relationship to estimate the temperatures of the drive coil 10 and of the field coil 4 when the values of the drive current, the field current and the blower rotation are given. Derivation of these formulae is explained below:

The power consumption $P_d$[W] at the drive coil 10 by the drive current $I_d$[A] is $$P_d = R_d I_d^2 \qquad (B-1)$$

Where $R_d[\Omega]$ denotes the resistance of the drive coil at the temperature $T_d$[K], and this can be described as a function of the temperature with denoting the measured reference resistance value $R_{d0}$ at the reference measurement temperature $T_{d0}$ and the temperature coefficients of the resistance of the drive coil $c_d$ as, $$R_d = R_{d0}[1 + c_d(T_d - T_{d0})] \qquad (B-2)$$

As a Joule heat generation at the rate expressed by (B-1) occurs at the drive coil, the drive coil temperature rises, that is, $T_d$ varies in time. But when the heat generation rate $P_d$ is constant, it will be balanced with the heat transfer by the cooling-air and other heat paths and will reach the thermal equilibrium at some temperature. We wish to have a simple formula that can estimate this equilibrium temperature $T_d$.

$T_d$ must be determined under the influence of many factors, but most essentially it would be proportional to the power consumption $P_d$ at the drive coil, and inverse-proportional to the blower rotation V[Hz] that is the source of the cooling air flow. So we here suppose that the following experimental formula would stand using the parameters ($k_d$, $\alpha_d$) which should be determined experimentally:

$$T_d - T_{in} = k_d P_d / V^{\alpha d} \qquad (B-3)$$

where $T_{in}$ is the air temperature at the air-intake.

From the above three equations, the equation below is obtained that describes $P_d$ as a function of the drive current $I_d$ and the blower rotation V:

$$P_d = R_{d0}[1 + c_d(T_{in} - T_{d0})]I_d^2/(1 - R_{d0}c_d I_d^2 k_d V^{\alpha d}) \qquad (B-4)$$

Just as the same as the above, equations about the field coil are gotten as below:

$$P_f = R_f I_f^2 \qquad (B-5)$$

$$R_f = R_{f0}[1 + c_f(T_f - T_{f0})] \qquad (B-6)$$

$$T_f - T_{in} = k_f P_f / V^{\alpha f} \qquad (B-7)$$

$$P_f = R_{f0}[1 + c_f(T_{in} - T_{f0})]I_f^2/(1 - R_{f0}c_f I_f^2 k_f V^{\alpha f}) \qquad (B-8)$$

On the other hand, the blower power consumption $P_b$ is described at the lowered rotation of V[Hz] by using the notation of $V_0$[Hz] for the nominal rotation and $P_{b0}$[W] for the nominal blower power consumption, $$P_b = P_{b0}(V/V_0)^3 \qquad (B-9)$$

When summarized, the five equations below are gotten:

$$P_d = R_{d0}[1 + c_d(T_{in} - T_{d0})]I_d^2/(1 - R_{d0}c_d I_d^2 k_d V^{\alpha d}) \qquad (B-4)$$

$$P_f = R_{f0}[1 + c_f(T_{in} - T_{f0})]I_f^2/(1 - R_{f0}c_f I_f^2 k_f V^{\alpha f}) \qquad (B-8)$$

$$P_b = P_{b0}(V/V_0)^3 \qquad (B-9)$$

$$T_d = k_d P_d / V^{\alpha d} + T_{in} \qquad (B-10)$$

$$T_f = k_f P_f / V^{\alpha f} + T_{in} \qquad (B-11)$$

In addition, although the thermal interaction between the drive coil and the field coil is neglected in the above explanation, it is necessary to count the interaction in the description of the physical situation. And in case of this general description, equation (B-10) and (B-11) can have a form of below:

$$T_d = T_1 - T_{in} = k_{dd} P_d / V^{\alpha dd} + k_{df} P_f / V^{\alpha df} \qquad (B-12a)$$

$$T_f = T_2 - T_{in} = k_{fd} P_d / V^{\alpha fd} + k_{ff} P_f / V^{\alpha ff} \qquad (B-12b)$$

That is, the temperatures $T_d$, $T_f$ are determined as the solutions of the simultaneous equations (B-12a)(B-12b). But for simplicity, the simplified equations (B-10) and (B-11) are used for the explanation here. Equations of (B-4), (B-8) and (B-9) are referred to by the name of "Power consumption formulae", and the equations (B-10) and (B-11) are by "temperature model formulae".

The parameters appear in the above five formulae, the coil resistances $R_{d0}$, $R_{f0}$, the reference temperatures $T_{d0}$, and $T_{f0}$, the thermal coefficients $c_d$ and $c_f$ and the temperature model coefficients $k_d$, $\alpha_d$, $k_f$ and $\alpha_f$ are defined for each individual shaker or for each model of the shaker by experimental measurement. As these formulae and parameters are used in the fast calculations that are carried out through the control operation, they are recorded as the form of program codes 27 in the master controller 25.

(3) Further, the standard operating condition and the amplifier ratings are recorded as the part of the optimization program 27 in the master controller 25.

1.4. Procedure of the Optimization Program 27

Figure 6:
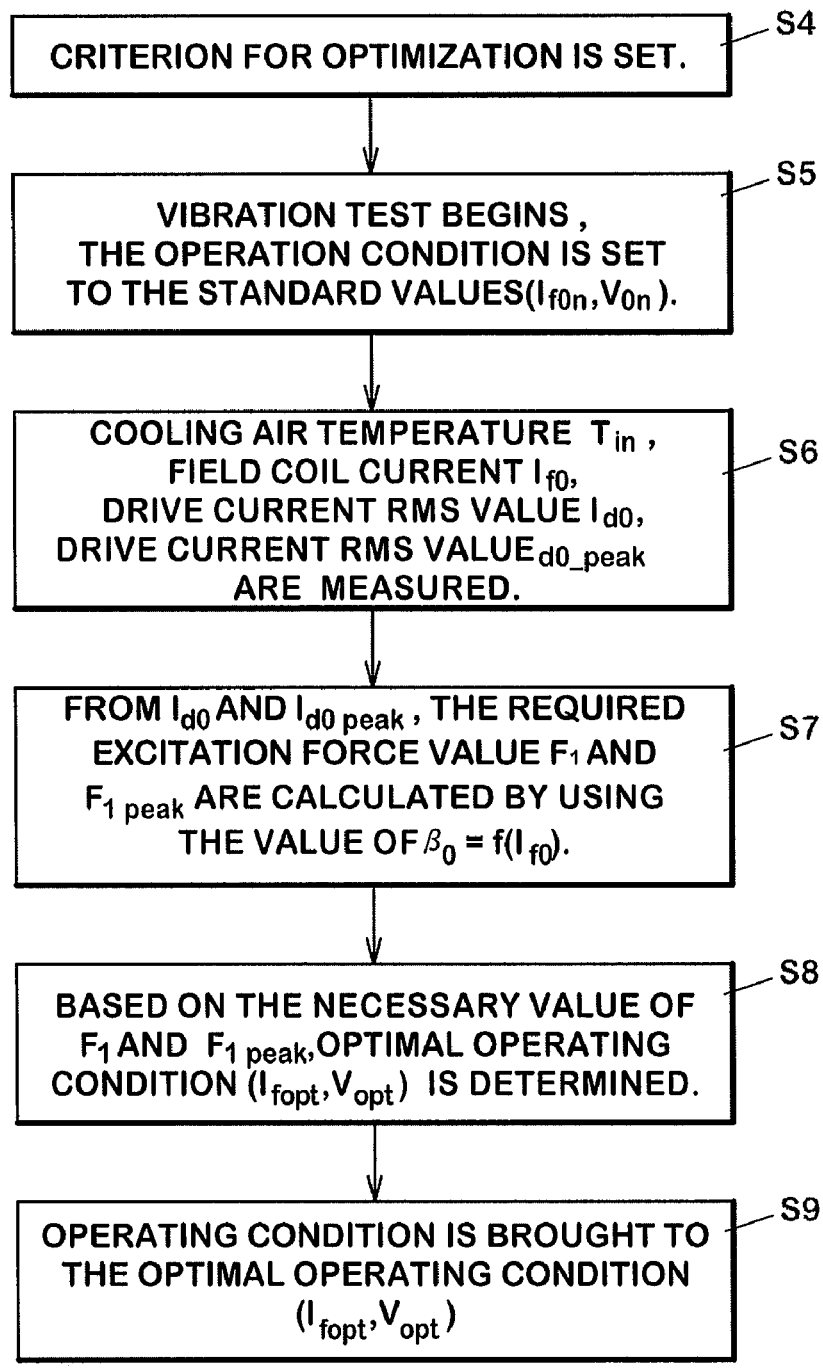
FIG. 6 is a flowchart of the optimization program of the operating condition 27.

A flowchart of the optimization program 27 for the operating condition is shown in FIG. 6.

At first, the operator fixes the specimen 20 on the top part of the armature 6 of the shaker 1 and sets the vibration controller 22 so that the desired vibration will be fed to the specimen 20. Here, we suppose that a desired random vibration is to be fed to the specimen 20. Then the desired vibration is described by frequency spectrum data, and the operator inputs the given spectrum data to the vibration controller 22.

The CPU 54 of the apparatus 100 inquires the operator to select the criteria of the optimization (For example Energy saving or Quiet noise or other parameter) through the display 50. The operator selects the criteria using the keyboard/mouse 58. Then the CPU 54 records the selected criteria of the optimization on the memory 52, and sends the information to the master controller 25. The master controller 25 records the received data of the criteria on the memory (step S4).

The CPU 54 of the apparatus 100 reads the recorded standard operating condition, and commands the variable field current power supply 26 to output the field current of standard value $I_{fon}$[A] via the I/O port 57 and the master controller 25. The variable field current power supply 26 controls the field current to be $I_{fon}$[A]. Just the same, the CPU 54 commands the variable blower power supply 28 to control the blower rotation to be the standard value of $V_{on}$[Hz] (step S5).

In this situation, the operator manipulates the vibration controller 22 to control the shaker 1 to feed the desired vibration to the specimen 20. Of course some automatic control of the vibration controller 22 for this activity by the apparatus 100 is possible.

Then the response acceleration is monitored by the sensor 30, and according to the acceleration information the drive current from the amplifier 24 is controlled, and the desired vibration is fed to the specimen 20.

After the control by the vibration controller 22 is settled, the master controller 25 carries out step S6. In this embodiment, it is assumed that the vibration control is settled after passing of a definite time (e.g. 1[s]). Judgment of the control settlement can be done when the change of the drive current RMS value has settled within a threshold by monitoring the said drive current.

In step S6, the master controller 25 measures the field current $I_{f0}$ which is the output of the variable field current power supply 26, and measures the drive current signal which is the output from the amplifier 24 and gets the RMS value $I_{d0}$ and the peak value $I_{d0\_peak}$. Also, the cooling air temperature $T_{in}$ is measured by the output of the temperature sensor 19.

Next, in step S7, the master controller 25 calculates the excitation force necessary to carry out the required test under the present load condition: At first, based on the Field current-Force coefficient formula (A-2), Force coefficient $\beta_0$ is calculated by substituting the measured field current value $I_{f0}$ to the variable $I_f$:

$$\beta_0 = K5*I_{f0}^5 + K4*I_{f0}^4 + K3*I_{f0}^3 + K2*I_{f0}^2 + K1*I_{f0}$$

As stated before, the presently generated excitation force $F_1$ (that is, the necessary force for this testing) is calculated by multiplying the measured drive current $I_{do}$ by this force coefficient $\beta_0$:

$$F_1 = \beta_o I_{do}$$

Just the same as above, by using the measured peak drive current value $I_{d0\_peak}$, the master controller 25 calculates the necessary peak force $F_{1\_peak}$:

$$F_{1\_peak} = \beta_o I_{do\_peak}$$

Next, the master controller 25 searches and determines the optimal operating condition based on the calculated data of necessary force RMS value $F_1$ and the peak value $F_{1\_peak}$, referring to the optimization criteria indicated by the CPU 54 (step S8).

In addition, the control by the vibration controller 22 is kept and the vibration testing of the specimen is continued.

A detailed flowchart of the optimization procedure of the operating condition is shown in the FIG. 7.

In the optimization procedure, the master controller 25 selects the operating condition that meets the optimization criteria among the combinations of the conditions of varied field coil current and the varied blower rotation.

At first, the case of standard field current $I_{fon}$ used for the variable $I_f$ is examined: in this case, steps S81, S82 and S83 are not processed as the drive current $I_d$ is actually measured. At step S84, calculation of total power consumption and estimate of the temperatures of the drive and field coil are done.

The case of the standard blower rotation $V_{on}$ (60[Hz], in this explanation) applied as V is examined first.

The drive power consumption $P_d$, the field power consumption $P_f$ and the blower power consumption $P_b$ are calculated by the following Power consumption formulae:

$$P_d = R_{d0}[1 + c_d(T_{in} - T_{d0})]I_d^2 / (1 - R_{d0}c_d I_d^2 k_d V^{ad}) \quad (B-4)$$

$$P_f = R_{f0}[1 + c_f(T_{in} - T_{f0})]I_f^2 / (1 - R_{f0}c_f I_f^2 k_f V^{af}) \quad (B-8)$$

$$P_b = P_{b0}(V/V_0)^3 \quad (B-9)$$

The total power $P_t$ is calculated as the sum of $P_d$, $P_f$ and $P_b$.

And by the Temperature model formulae the temperatures of the drive coil and the field coil at the thermal equilibrium are estimated, using the measured temperature data of the cooling air by the sensor 19, as $$T_d = k_d P_d / V^{ad} + T_{in} \quad (B-10)$$

$$T_f = k_f P_f / V^{af} + T_{in} \quad (B-11)$$

Next, the master controller 25 judges whether the estimated value of $T_f$ and $T_d$ are within the predetermined limitation of coil temperature (step S85).

When in the case the temperature limitation is exceeded, a marking that indicates the condition is impossible to be used (e.g. "NG") is recorded, in addition to the records of the calculated values of total power $P_t$, estimated temperatures of the field coil $T_f$ and of the drive coil $T_d$ in the data tables shown in the FIG. 8 A, B, C and D (step S86).

FIG. 8A is the data table recording the drive coil equilibrium temperature $T_d$ estimation for the combinations of field current and blower rotation. It can be seen that $T_d$ is estimated as 60 degree Celsius when the field current is 20[A] and the blower rotation is 60[Hz]. When this temperature value is exceeding the limitation, the marking "NG" is recorded in the table in FIG. 8D. FIG. 8B is the similar table for the field coil temperature $T_f$. FIG. 8C is that for the total power consumption $P_t$, and FIG. 8D is the table to record the cases that either or both of the coil temperatures exceed the limitation.

Next, the master controller 25 checks whether the blower rotation values to be examined still remain (step S87). Here, as we have examined only the case of the standard rotation value of $V_{on}$, we should continue to examine the cases for other rotation values (e.g. 50[Hz]), returning to the step S84.

As such, the drive coil temperature, the field coil temperature and the total power consumption are estimated for all the supposed blower rotation values that should be examined. When the supposed rotation values are examined in descending order, the procedure can be broken at the stage when the violation of the temperature limitation by either of the coils occurred. It is obvious that the lower rotation value gives higher temperature estimates than the critical rotation value.

When all the supposed blower rotation values are examined (or the temperature limitation is exceeded in mid-flow), field current supposed value is varied and examined. In the above, the field current value $I_f$ to be examined was taken to $I_{fon}$, and now another field current value (e.g. 18[A]) is examined in step S81 and in the succeeding steps.

In step S81, the Force coefficient $\beta$ when the field current is varied from $I_{fon}$ to $I_f$ is calculated using the Field current-Force relationship (A-2).

Next, the necessary drive current RMS value $I_d$ and the peak value $I_{d\_peak}$ are calculated by using the data of the necessary force RMS value $F_1$ and the peak value $F_{1\_peak}$ calculated in step S7 (step S82). Formulae are shown below:

$$I_d = F_1 / \beta$$

$$I_{d\_peak} = F_{1\_peak} / \beta$$

Then, the calculated supposed drive current RMS value $I_d$ is checked whether it is within the maximum rating of the amplifier 24. Just the same, the calculated supposed drive current peak value $I_{d\_peak}$ is checked whether it is within the maximum peak rating of the amplifier 24 (step S83).

When exceeded, marking "NG" is recorded in the corresponding part of the table in FIG. 8D. And returning to step S81, the next supposed drive current (e.g. 16[A]) is examined.

When not exceeded, the steps following on from Step 83 are processed, and the data of the temperatures of the coils and the total power consumption under the varied blower rotation values one by one are recorded in the table as shown by FIG. 8. When all the supposed blower rotation values are examined (or broken in mid-flow), returning to step S81 occurs and further examination about the next field current is carried out.

When above is repeated for all the supposed field current and blower rotation values and the calculation is finished, the master controller 25 carries out the selection of the optimal operating condition, referring to the table in FIG. 8. For instance, when "Energy saving" is defined as the criterion, the minimum total power consumption case in FIG. 8C is selected among those possible cases that has no "NG" marking in the table in FIG. 8D (step S88).

And when the optimal operating condition is determined, the master controller 25 controls the variable field current supply 26 and the variable blower power supply 28 to bring the operating condition to the determined optimal conditions with keeping the vibration test by the vibration controller 22 continued and unaffected (step S9).

And in this procedure if the change of the field current is too fast, the effect by the vibration controller 22 might cause to feed an undesirable transient vibration to the specimen 20 because the vibration controller 22 reacts to cancel out the change of the force coefficient of the shaker too rapidly. So, the change of the control condition to the determined optimal condition is gradually carried out in a stepwise fashion.

In this embodiment, the master controller 25 controls each step in the change of the field current to be 1) not larger than a defined value (e.g. 1[A]) and 2) not faster than a defined duration (e.g. 1 [s]).

Condition 1) is to avoid too large change per step, and the condition 2) is to avoid undesirable interference of the control with that of the vibration controller 22.

Blower rotation is also changed gradually avoiding the mechanical and electrical stress that could occur when the change was too fast.

As described above, it is possible to determine an optimal operating condition automatically within the procedure and continue the test execution without stopping.

In addition, to provide the operator the ability to monitor this automatic optimization procedure, the master controller 25 sends the resultant data of the optimization to the CPU 54. And the CPU 54 indicates the data, as shown by example in FIG. 9, on the display as a report of the control status at present.

2. A Second Embodiment

In the above first embodiment, random vibration test was taken as the example for explanation. Random vibration test is a test method to generate a stationary random vibration having a defined desired spectrum. Therefore it is usual that the drive current does not show a significant change after it has settled. So, although the automatic optimization process of the operating condition is carried out continuously throughout the testing, it is usual that the resultant operating condition also does not show a significant change.

But in case of a test that feeds a sinusoidal vibration with its frequency varying (Swept-sine vibration test), the drive current must be varied with time even if the generated acceleration level was constant because of the existence of the response characteristics of the shaker 1 and test load 20. Even in such cases, the method of this invention can be applicable; for instance when the drive current is averaged and peak value measured for the duration of the full single way of the frequency sweep, an optimization for the whole swept frequency band is possible to be done.

Figure 10:
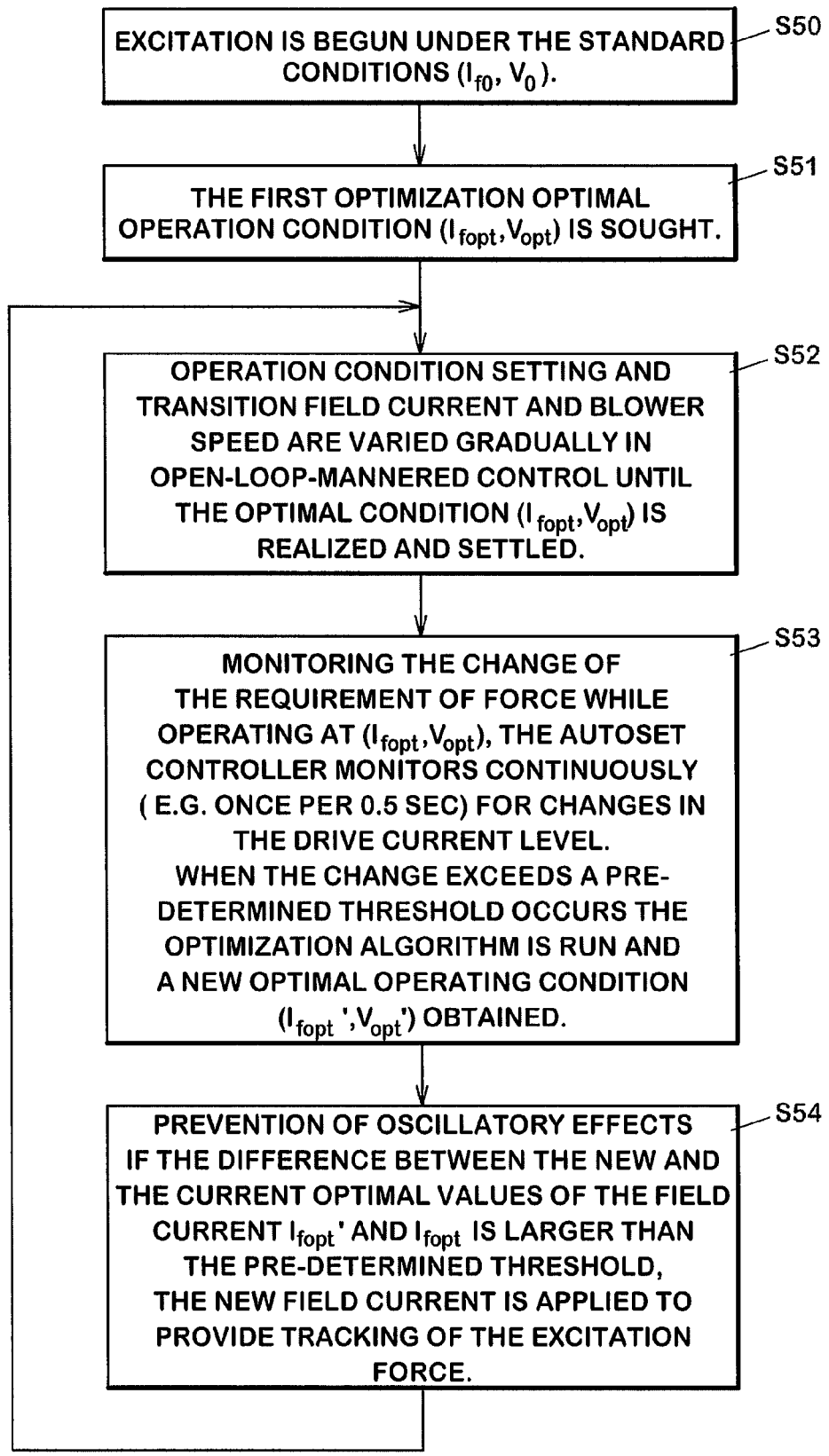
FIG. 10 is a flowchart of the optimization program of the operating condition 27 of the second mode of embodiment.

A better track ability of this optimization process of the operating condition can be realized if the optimal operating condition is calculated along side the excitation frequency change. For this, it would be possible to shorten the averaging time (one sweep cycle) of the drive current in the process stated above, when the change of the frequency is not too fast. This procedure is explained below:

A flowchart of the optimization program for the operating condition that the case of the excitation situation does not change too fast is shown in FIG. 10.

Step S50 and S51 are the same as steps S4 to S8 in the first embodiment, and step S52 is equal to the step S9.

After the determined optimal operating condition is realized once, the master controller 25 continues to monitor the drive current periodically (e.g. once per 0.5 [s]).

And judges whether the drive current varied at an extent larger than a defined threshold or not. (step S53) When the change is smaller than the threshold, no change of the operating condition is made. This is to avoid the bad influences to change the condition according to too small changes. When a change larger than the threshold is detected, then the optimization process (step S6 to S8 in FIG. 6) is activated to re-determine the optimal operating condition. And the control to bring the system to the new operating condition is done (step S54).

As stated above, when the excitation situation does not change too fast, it is possible to track the change and control the operating condition to be always optimal for the present excitation situation at each moment. Here, the words "not change too fast" means that the varying speed of the excitation situation is slow enough compared to the speed of the optimization of the operation. In the actual implementation of this embodiment using the hardware configuration explained above, optimization control of the operating condition based on the observation of the drive current for 2 [s] averaging is achieved; that is, an excitation situation change occurring slower than 2 [s] can be surely tracked by the apparatus of this embodiment.

In addition, the control method in this embodiment can be applied not only to the swept-sine test as above, but also to such situations where the specimen characteristics change during the random vibration test or to situations such as the excitation level is changed during the testing. By application of these techniques, the control method can also be applied to any other form of vibration testing, including, but not limited to, Sine-on-Random, Random-on-Random, Spot Sine, Shock, Waveform replication, Resonance Dwell and so on.

3. Other Embodiment

In the above stated embodiments, calculation process of the supposed drive current does not pay attention to the frequency characteristics of the control objects. Frequency characteristics of the excitation system and/or of the desired vibration can be regarded in the process of calculation of the drive current in the optimization of the operating conditions.

Although the apparatus 100 for optimization of operating condition is assumed to be independent from the vibration controller in the above stated embodiments, however these two can be unified at the embodiment.

Although it is described that the transition to the determined optimal operating condition is controlled to occur with keeping the test excitation, alternatively some trial excitation stage can be set for the optimization. And real or actual testing can be carried out after stopping the trial excitation and starting the real test with the operating condition already set to the optimized operating conditions And when the same test condition is repeatedly applied to specimens, it is possible to calculate the optimal operating condition prior to the test operation: At first, CPU 54 measures the drive current during the test operation and records the data as a time series. Next, calculation of the optimal operating condition at each moment is carried out by using the recorded drive current data at each moment. The calculation process is already described above, and this calculation can be done in an off-line manner using external computers. In this way, the optimal operating condition at each moment after the particular test start is determined. Subsequently, this operating condition data is fed to the master controller 25, and the operation based on the optimal operating condition at each moment (calculated prior to the operation) is carried out.

In this manner, for example, when the drive current of a conventional shaker system working at a customer is measured and recorded, off-line calculation of the optimal operating condition and estimation of the effectiveness of the apparatus of this invention becomes possible.

In the above embodiments, the optimal operating condition is calculated based on the measured drive current. But direct measurement of the drive current is not always required, but 'substantial measurement' of the drive current is also possible; calculated drive current data using the drive current-acceleration characteristics data measured prior to the operation and the data of required acceleration such as swept-sine profile can be usable for the process.

In the above embodiment, the thermal equilibrium temperatures of the coils are estimated using the thermal model of the coil temperature based on the information of the cooling air temperature. But temperature information of the field coil 4 can be gotten through the measurement of the field coil current and voltage; when resistance change by the temperature can be detected, then the coil temperature can be estimated by using a pre-determined table or thermal coefficient of the coil resistance. The same method can be applied to the drive coil 10.

Of course, direct measurement of the coil temperatures is possible by attaching thermal sensors to the coils. But attaching a sensor to the drive coil is not easy in general, so this method may diminish the simplicity of the embodiment. Also there is a durability problem of the attached sensor on the moving armature.

By such point of view, the direct measurement method of coil temperatures ideally should not be employed in the above stated method and the method to estimate the coil temperature solely based on the information of the currents fed to the coils by using the coil thermal model. As the estimated coil temperatures can only have the meaning of the "temperature at the thermal equilibrium in the stationary state", there remains the possibility that a very different estimated temperature compared to the actual temperature can occur. Also there is a risk of estimation error caused by the limitation of the thermal model.

But in the cases stated here, as the present temperature of the coils can be known by direct measurement, more accurate optimal control can be possible such as the method to adjust the blower rotation by directly comparing the measured coil temperatures with the temperature limitation.

In an alternative method, the temperature of the field coils and drive coils can be got from measurement of the air inlet temperature and air outlet temperature. The temperature difference is proportional to the power dissipated in the coils. The power dissipation in the coils is known by measurement and by control and the blower speed is also known by control. With these known parameters, the temperature of the coils can be calculated by using the thermal model.

In the above statements, the calculation method is explained by using the directly measured data of the drive and field current, but the method can of course include the case that the currents are in-directly measured by voltage.

In the above stated embodiment, the selection of the best fit operating condition is done by the master controller 25. But other methods are possible such as the operator selects from among all the possible conditions that satisfy the criteria and are displayed for the operator.

Also, not "either item of the total power consumption or blower rotation" but both of them can be the object of the optimization criteria; for this, some weighting on each item can be useful for the selection.

In the above stated embodiment, sound noise level is estimated through the cooling capability (blower rotation). But direct measurement method of sound noise can be applied to the optimization procedure.

Although an air-cooled shaker system case was given in the above stated embodiment, this method is also applicable to the water-cooled shaker systems. And in the water-cooled system case, as the formation of dew on over-cooled tubing in the ambient air can be a problem, a lower limitation of the coil temperature can be considered as a constraint of the optimization.

Generally, the focused feature of operation can be defined for example as system energy (minimizing system energy), system efficiency (maximizing system efficiency), blower noise (minimizing blower noise) or any other system feature that would be the focus of minimizing or maximizing the particular system parameter. The focused feature of operation may also be a combination of features and weighting may or may not be employed for each feature.

In the above examples of the embodiment, the time from the beginning of the excitation at step S5 to the data acquisition of the currents and others at step S6 is assumed as a pre-determined definite time. But this time can be managed by the operator according to the content of the testing. This time can also be determined through observation of the drive signal.

In the above embodiment, a combination of the field current and the cooling capability (blower rotation) is selected among the possible combinations of supposed field current and supposed blower rotation that satisfy the temperature condition searched by varying both of the field current and the blower rotation. But it is also possible to vary the blower rotation only, with the field current fixed, by selecting a blower rotation among possible ones that satisfy the temperature condition. This method is suitable for the waveform replication test such as those called SHOCK test during which the field current should be kept fixed or for the idling state during which the field current can be kept constant at a smaller value.

In concrete terms, operating condition (blower rotation) is determined by the following procedure: Fixing the specimen to be tested to the armature, feeding the determined field current, the drive current is controlled so that the desired vibration is applied to the specimen, and the drive current value in this state is detected. Next, supposed temperatures of the field coil and the drive coil are calculated under each of the supposed cooling capability of the cooling apparatus which is varied for calculation. And a supposed operating condition (blower rotation) that does not exceed the temperature limit is selected as the operating condition. As such, a proper blower rotation can be selected.

EXAMPLE

Experimental data of the time traces of the currents, blower rotation and the power consumption during a controlled vibration test by the second embodiment of the apparatus 100 for optimizing the operating condition are shown in FIG. 11A, 11B and FIG. 12A, 12B.

IMV vibration test system model "i240/SA3M" was used as the shaker 1 and the amplifier 24, and IMV Digital vibration control system "K2" as the vibration controller 22 was used. Specimen 20 was a dummy mass load of 120 kg, and the dedicated hardware developed for the embodiment of this method was used. Optimization criterion was "Energy save".

Figure 11A:
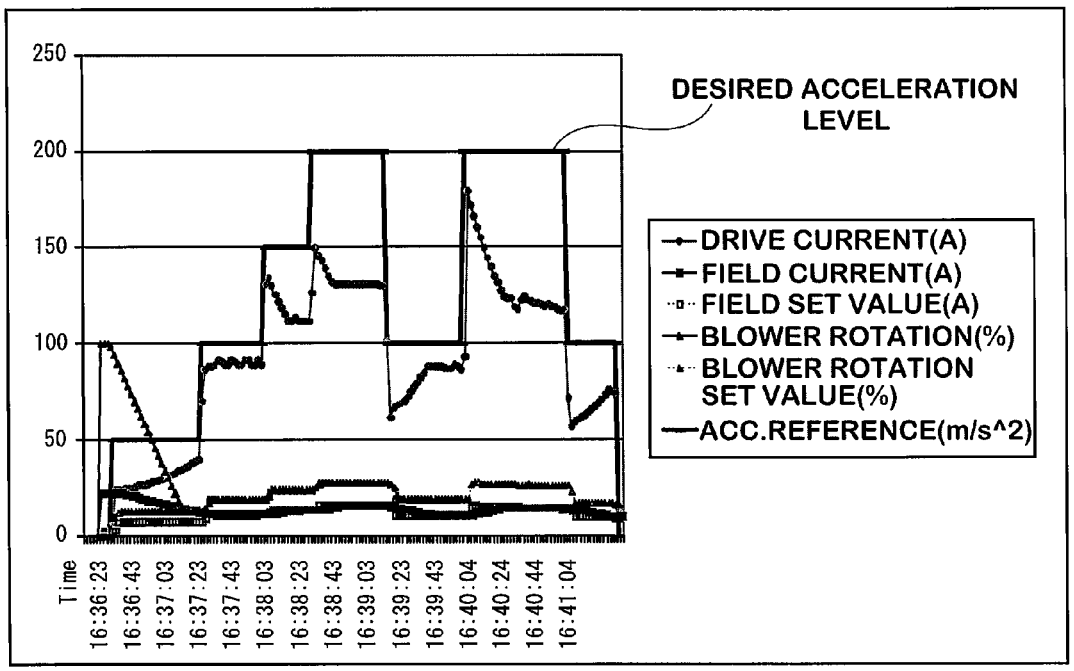
FIG. 11 is a graphical display of experimental results gotten by the apparatus for optimizing the operating condition in the second mode of embodiment.
Figure 11B:
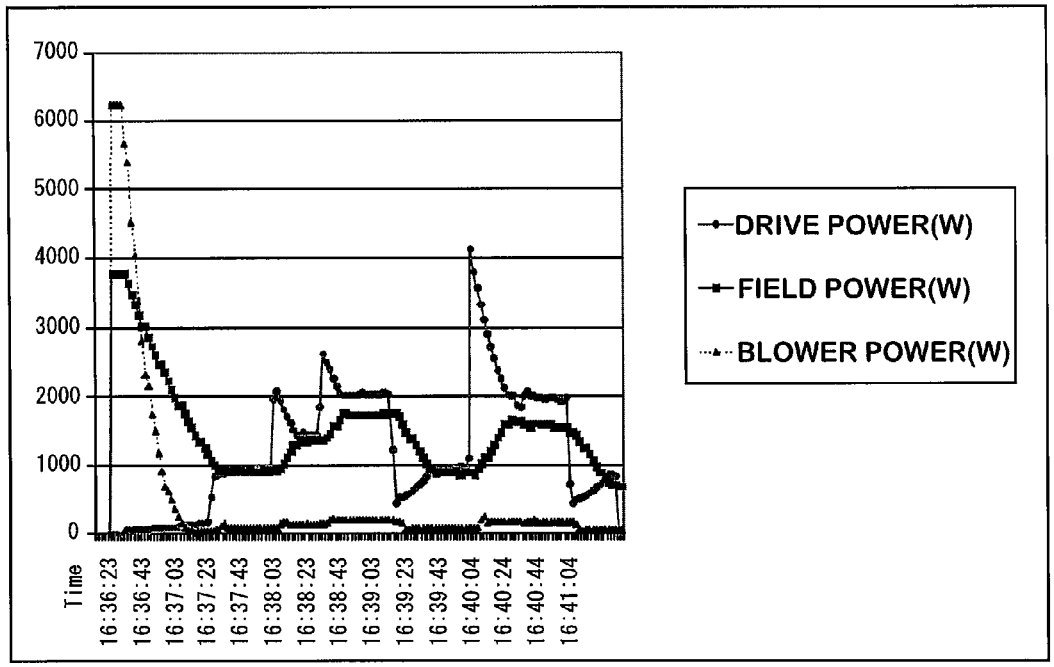

As seen in FIG. 11A, the reference acceleration profile (desired vibration) was suddenly increased or decreased, and the changes of the drive and field current are seen in the same figure. FIG. 11B is showing the power consumption at the drive coil 10, consumption at the field coil 4 and consumption at the blower. The dramatic reduction of the blower power consumption and that of the field coil are observed clearly, and these are contributing to reduce the total power consumption.

Figure 12A:
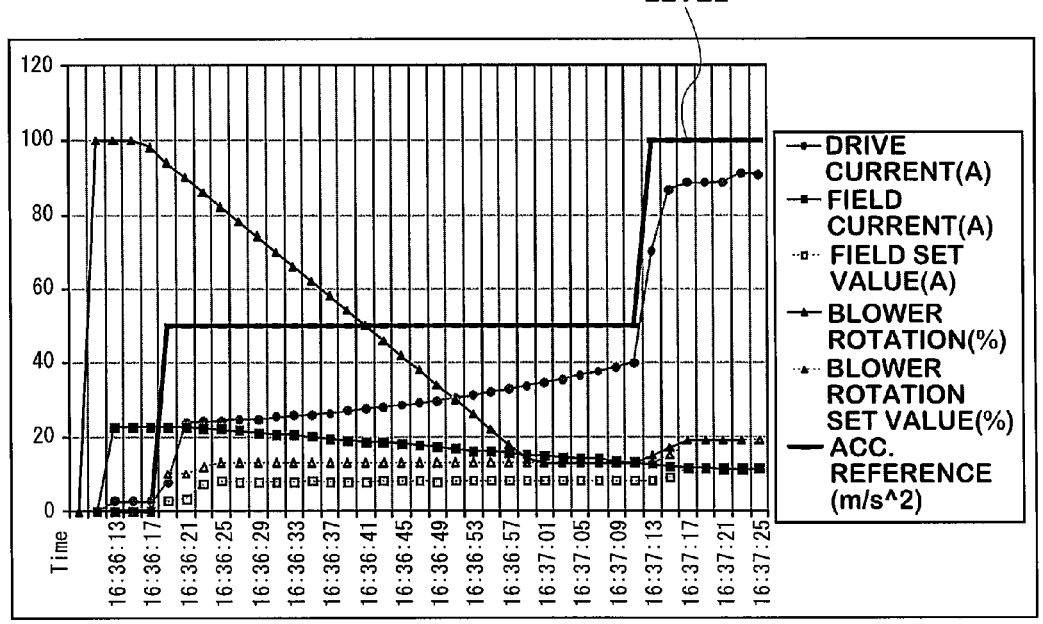
FIG. 12 is a graphical display of experimental results gotten by the apparatus for optimizing the operating condition in the second mode of embodiment.
Figure 12B:
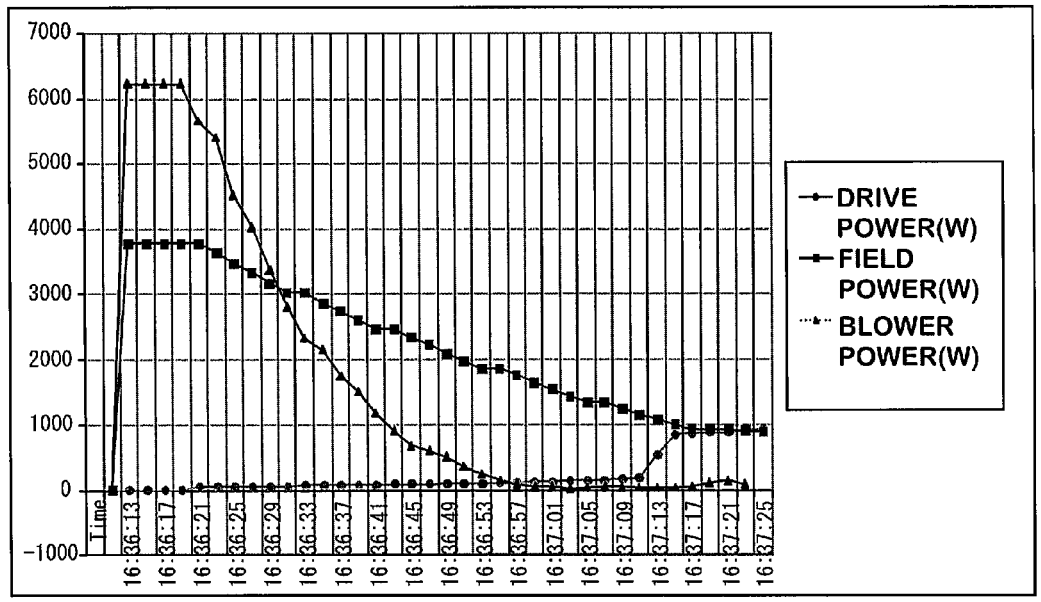

FIGS. 12A and 12B are zoomed displays of the first 80[s] of FIGS. 11A and 11B and show greater detail.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. An apparatus for determining an operating condition of a shaker system that has a field coil, a drive coil that is set in a static magnetic field generated by the field coil and is driven by electromagnetic force, an armature that transfers the force generated at the drive coil to a test specimen, a cooling apparatus to cool the field coil and the drive coil, comprising:
    means for calculating a necessary excitation force that is the excitation force presently generated by the shaker system, based on information of drive current necessary to yield a desired vibration for the test specimen under condition of a definite field current that is fed as initial field current;
    means for calculating supposed drive current necessary to generate the necessary excitation force under each supposed field current, the supposed field current being supposed to be varied from the initial field current;
    means for calculating supposed temperatures of the field coil to which each of the supposed field current is fed and supposed temperatures of the drive coil to which each of the supposed drive current is fed under each supposed cooling capability of the cooling apparatus;
    means for selecting at least one operating condition that is a combination of the supposed field current and the supposed cooling capability under which the supposed temperatures of the field coil and the drive coil will not exceed limitation and a focused operating feature will be satisfied among multiple combinations of the supposed field current and the supposed cooling capability; and
    means for outputting the at least one of the operating conditions.

2. An apparatus according to claim 1, wherein the means for calculating the supposed drive current calculates averaged RMS value and peak value of the supposed drive current; and
    the means for selecting the operating condition uses selection criterion that the averaged RMS value and the peak value of the supposed drive current will not exceed rating RMS value and peak value of the supply circuit of the drive current.

3. An apparatus according to claim 1, wherein the means for selecting the operating condition uses selection criteria that the supposed temperatures of the field coil and the drive coil will not exceed a temperature limitation, and a sum of supposed field power consumed by the supposed field current and supposed drive power consumed by the supposed drive current and supposed cooling power to get the supposed cooling capability will be a minimum.

4. An apparatus according to claim 1, wherein the means for selecting the operating condition uses the selection criteria that the supposed temperatures of the field coil and the drive coil will not exceed a temperature limitation, and the cooling apparatus sound noise will be a minimum.

5. An apparatus according to claim 1, wherein the means for outputting the operating condition varies the field current gradually in stages from a present value to supposed value specified in the selected operating condition, and keeps a stepwise change speed slower than the control speed of a vibration controller that controls the drive current so that desired vibration is yielded under the given field current.

6. An apparatus according to claim 1, further comprising means for monitoring the drive current after the means for outputting the operating condition outputs the selected operating condition, and for obtaining a new operating condition by activating the means for calculating the necessary drive force, the means for calculating the supposed drive current, the means for calculating the supposed temperatures and the means for calculating the operating condition,
    wherein a new operating condition is output from the means for outputting the operating condition.

7. An apparatus according to claim 1, further comprising means for controlling the cooling apparatus that monitors temperatures of the field coil and the drive coil under the controlled operating condition, and controls to increase the cooling capability when either of the temperatures exceeds the limitation.

8. An apparatus according to claim 1, wherein the means for outputting the operating condition outputs the operating condition selected by the means for selecting the operating condition in real-time manner.

9. An apparatus according to claim 1, wherein the means for outputting the operating condition outputs the operating condition selected by the means for selecting the operating condition prior to the operation.

10. An apparatus according to claim 9, wherein the means for selecting the operating condition calculates the operating condition at each moment as a time series.

11. An apparatus for determining an operating condition of a shaker system that has a field coil, a drive coil that is set in a static magnetic field generated by the field coil and is driven by electromagnetic force, an armature that transfers force generated at the drive coil to a test specimen, a cooling apparatus to cool the field coil and the drive coil, comprising:
    means for detecting a drive current necessary to yield a desired vibration for the test specimen under the condition of a presently fed field current;
    means for calculating supposed temperatures of the field coil to which each of field currents is fed and supposed temperatures of the drive coil to which each of necessary drive current is fed under each supposed cooling capability of the cooling apparatus;
    means for selecting at least one operating condition that is a supposed cooling capability under which supposed temperatures of the field coil and the drive coil will not exceed limitation; and
    means for outputting an operating condition.

12. A method for determining the operating condition of a shaker system that has a field coil, a drive coil that is set in a static magnetic field generated by the field coil and is driven by electromagnetic force, an armature that transfers force generated at the drive coil to a test specimen, a cooling apparatus to cool the field coil and the drive coil, comprising steps of:

calculating a necessary excitation force that is an excitation force presently generated by the shaker system, based on information of drive current necessary to yield the desired vibration for the test specimen under the condition of a definite field current that is fed as an initial field current;

calculating the supposed drive current necessary to generate the necessary excitation force under each of the supposed field currents, the supposed field current being supposed to be varied from the initial field current;

calculating supposed temperatures of the field coil to which each of the supposed field current is fed and supposed temperatures of the drive coil to which each of the supposed drive current is fed under each supposed cooling capability of the cooling apparatus;

selecting at least one operating condition that is a combination of the supposed field current and the supposed cooling capability under which the supposed temperatures of the field coil and the drive coil will not exceed limitation and a focused operating feature will be satisfied among multiple combinations of the supposed field current and the supposed cooling capability; and outputting at least one of the operating conditions.

* * * * *